(12) United States Patent
Thiagarajan (10) Patent No.: US 9,507,008 B1
(45) Date of Patent: Nov. 29, 2016

(54) LOCATION DETERMINATION BY CORRECTING FOR ANTENNA OCCLUSION

(71) Applicant: Amazon Technologies, Inc., Reno, NV (US)

(72) Inventor: Arvind Thiagarajan, Cambridge, MA (US)

(73) Assignee: Amazon Technologies, Inc., Reno, NV (US)

( * ) Notice: Subject to any disclaimer, the term of this patent is extended or adjusted under 35 U.S.C. 154(b) by 52 days.

(21) Appl. No.: 14/105,925

(22) Filed: Dec. 13, 2013

(51) Int. Cl.
*G01S 5/00* (2006.01)

(52) U.S. Cl.
CPC .................................... *G01S 5/0027* (2013.01)

(58) Field of Classification Search
CPC . H04B 7/0808; H04B 7/0817; H04B 7/0811
See application file for complete search history.

(56) References Cited

U.S. PATENT DOCUMENTS

| | | | | |
|---|---|---|---|---|
| 6,006,077 A * | 12/1999 | Shull | ........................... | 455/226.2 |
| 7,933,612 B2 * | 4/2011 | Counts | .................. | G01S 5/0252 455/456.1 |
| 8,681,736 B2 * | 3/2014 | Nader | ................... | H04W 36/30 370/331 |
| 8,854,998 B2 * | 10/2014 | Johansson | ............. | H04W 24/10 370/252 |
| 2008/0161011 A1 * | 7/2008 | Babin | ................... | H04W 64/00 455/456.1 |
| 2009/0143106 A1 * | 6/2009 | Meitzler et al. | .............. | 455/566 |
| 2013/0033996 A1 * | 2/2013 | Song et al. | .................... | 370/252 |
| 2014/0118011 A1 * | 5/2014 | Burger | .................. | G06F 1/1684 324/676 |
| 2014/0323141 A1 * | 10/2014 | Boos | ........................ | H04B 7/02 455/452.1 |
| 2014/0335916 A1 * | 11/2014 | Thorson | ................ | G06F 1/1626 455/566 |

* cited by examiner

*Primary Examiner* — Dung Hong
(74) *Attorney, Agent, or Firm* — Sutherland Asbill & Brennan LLP (57) ABSTRACT

Systems and methods for receiving a plurality of wireless communication signals and identifying an antenna occlusion condition from the received plurality of wireless communication signals is disclosed. A correction factor may be determined based at least in part on determined signal strength corresponding to each of the received wireless communication signals. The correction factor may be used to determine a location based at least in part on the signal strength corresponding to each of the received communication signals and the determined correction factor.

15 Claims, 6 Drawing Sheets

LOCATION DETERMINATION BY CORRECTING FOR ANTENNA OCCLUSION

BACKGROUND

User devices, such as smart phones and tablet computing devices, are often configured to determine their location by a variety of mechanisms. For example, location may be determined from Global Navigation Satellite System (GNSS) signals, such as Global Positioning Satellite (GPS) signals, or from inertial sensor signals, such as microelectromechanical (MEMS) based accelerometer signals. Location may also be determined, particularly for many indoor applications, from communication signals received by the user devices from sources of the communication signals. For example, the user devices may receive a plurality of Wi-Fi signals and, based thereon determine either an absolute location or a relative location from a previous point where the Wi-Fi signals were detected. The relative signal strength of each of the plurality of received communication signals may be used by the user device to determine the location of the user device. The communication signals that are used for determining location may be received by the user device via one or more antennas. Sometimes, these antennas may become occluded, such as if a user holds the user device in a manner where his/her fingers cover and/or are in the proximity of the one or more antennas or if the user device is place on an electrically conductive surface. When the antennas become occluded, the resulting signal strength measurements of the received communication signals may be unreliable and may, therefore result in unreliable location determination.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Example embodiments of the present disclosure may include systems and methods for determining location information by a user device, such as a personal communication device, based at least in part on wireless communication signals received by the user device via one or more antennas disposed on the user device. Example embodiments of the present disclosure may further include systems and methods for determining if the one or more antennas associated with the user device are occluded, or are otherwise in a state where there is relatively substantial attenuation of the received communication signals within relative proximity of the user device. In some cases, the occlusion of the one or more antennas of the user device may be great enough that location information determined by the user device, without correcting for the occlusion, may result in relatively high levels of inaccuracy, imprecision, and/or are otherwise unreliable. Further example embodiments of the present disclosure may include systems and methods for correcting for antenna occlusions detected by the user device in determining location based at least in part on the received communication signals. The determination of location information of the user device by correcting for a detected occlusion of the one or more antennas of the user device may result in a relatively more accurate, precise, and/or otherwise reliable determination of location information of the user device than without the correction for detected occlusion of the one or more antennas. According to still further example embodiments of the present disclosure, systems and methods may be configured to determine that a previously detected occlusion condition of the one or more antennas of the user device no longer exists and that any corrections associated with the previously detected occlusion condition may be removed and/or modified.

According to example embodiments, wireless communication signals received by the user device may be Wi-Fi signals, cellular signals, Bluetooth signals, or any variety or combinations of suitable communication signals. The user device may further be configured to determine the signal strength associated with the received communication signals. For example, in the context of Wi-Fi or other communication signals, received from a Wi-Fi or other protocol access point (AP), the user device may be configured to determine a received signal strength indicator (RSSI) metric that corresponds to a measure of power associated with the received wireless communication signal. In some non-limiting examples, the RSSI of a received communication signal may be determined by the user device by sampling a received wireless communication signal and determining a power associated with the sampled signal. In some cases, an analog-to-digital converter (ADC) of the user device may be used to sample the received communication signals and determine a signal strength, such as RSSI therefrom. The signal strength of the received wireless communication signals may be in any suitable metric and/or unit. In some example embodiments, the signal strength of the received wireless communication signals may be provided on an arbitrary scale (e.g. a scale of 0 to 100). Therefore, the power of the received communication signals may be scaled for representation on the arbitrary scale. For example, the power of the received communication signals may be scaled to the most powerful of the signals received (i.e. the most powerful signal may be 100 and other signals may be a ratio that represents their power relative to the most powerful signal). In other cases, the power of the received communication signals may be represented as an absolute measurement. For example the power of the received communication signals may be represented as a raw value of their power in milli-Watts (mW) or decibels relative to a mW (dBm).

The determination of the power associated with the received wireless communication signal may be performed in any suitable manner. In some example embodiments, the power associated with a received wireless communication signal may be determined at an intermediate frequency (IF), prior to IF signal amplification. In other example embodiments, the power associated with the received wireless signal may be determined for the corresponding baseband frequency, prior to baseband amplification. In yet other example embodiments, the RSSI may be determined based on the as-received communication signal (i.e. including the carrier frequency of the received communication signal). In example embodiments, regardless of the mechanism for determining the signal strength of the plurality of received wireless communication signals, the same mechanism may be applied to all of the received wireless communication signals. This may result in signal strength measurements corresponding to each of the received wireless communication signals that can be compared with each other (e.g. signal_1 is stronger than signal_2, signal_2 is increasing while signal_3 is decreasing, etc.).

In certain example embodiments, the user device may be communicatively coupled to the communication infrastructure, such as a Wi-Fi AP (e.g. wireless router) or a cellular service tower, from which the wireless communication signals are received by the user device. The communication infrastructure may provide the user device communicative connection to communication networks, such as a local area network (LAN), wide area network (WAN), and/or the Internet. In other words, the user device may be using the services of a base station from which it receives the wireless communication signal. In other example embodiments, the user device may be configured to receive and detect signal strength of a wireless communication signal to which the user device may not be connected and that the user device may not be using for access to a network. In other example embodiments, the user device may be communicatively coupled to one or some of the communication infrastructure associated with the wireless communication signals that it receives, but not others.

In example embodiments, the user device may be configured to repeatedly sample the received plurality of communication signals to determine a time series of RSSI associated with each of the plurality of received communication signals. The repeated sampling of the received signals may be at a predetermined sampling frequency, or alternatively, a variable frequency. The time series of RSSI may be used to determine spatial movement, or change in location of the user device. One or more of the RSSI data points of the RSSI time series, corresponding to the plurality of communication signals, may be used as a baseline, and changes therefrom may be used to determine locations of the user device. The user device may use triangulation methods and/or algorithms based off of three or more received wireless communication signals to determine a relative location (e.g. location relative to previous points where RSSI was measured) and/or an absolute location (e.g. latitude, longitude, and/or altitude of the user device). In example embodiments, an absolute location of the user device may be determined by the user device based at least in part on information associated with the absolute location of one or more communication infrastructure, such as Wi-Fi APs, from which wireless communication signals are received. In further example embodiments, an absolute location of the user device may be determined based at least in part on an absolute measurement of a location by a mechanism other than triangulation based on received wireless communication signals. For example, if a particular absolute location is determined using GPS signals and the user device determines its relative movement from that particular location using received wireless communication signals, then the user device may be configured to determine the user device's absolute location based at least in part on the known particular location and the relative movements therefrom.

Generally, the RSSI data points of the received wireless communication signals may vary relatively smoothly within the time series of the RSSI. In other words, generally, the time series of the RSSI of a particular received communication signal or a group of received communication signals may not be discontinuous with respect to time. In some cases, particularly when an antenna occlusion event takes place, there may be a discontinuity in the time series of RSSI measurement data points of a group of received wireless communication signals. In example embodiments of the disclosure, the user device may be configured to determine that an antenna occlusion event has occurred and/or that an antenna occlusion condition exists, based at least in part on a relatively sharp change in RSSI relative to time of more than one received communication signals. For example, if all of the received communication signals display a relatively sharp drop in RSSI at a particular point in time, then that may be an indication that an antenna occlusion event has occurred. In other words, a relatively sharp drop in the RSSI of all (or most) of the received communication signals may indicate that the antenna(s) of the user device are in an occluded condition. Occlusion, as used herein, may be any condition and/or event that interfere with the reception and/or transmission of wireless communication signals by the user device via the one or more antennas of the user device. Examples of occlusion events may include, but are not limited to, placement of fingers or other conductive body parts on or near the one or more antennas of the user device, placing the user device on an electrically conductive surface, and/or locating the user device in a faraday cage, such as an elevator with electrically conductive walls.

In some example embodiments, additional sensor signals may be received by the user device and considered in determining that the antennas of the user device are occluded. For example, inertial sensor signals, such as signals from micro-electro-mechanical system (MEMS) accelerometers of the user device may be considered to determine if the user device is moving. If movement in the user device is detected, then a new baseline for the RSSI of the received wireless communication signals may be established for the purposes of detecting relatively sharp changes in the RSSI. This baseline and change therefrom may be used for the purposes of identifying changes in the RSSI that are indicative of an occlusion condition.

An occlusion event may be determined by identifying a particular change in the RSSI with respect to time (or slew rate) of the plurality of received wireless communication signals below a predetermined threshold level (e.g. a negative predetermined threshold level indicating a decrease in RSSI). In example embodiments, the relatively sharp decrease in the RSSI corresponding to an occlusion event may result in a negative slew rate of RSSI. Therefore, if the measured and/or calculated negative slew rate of the RSSI is compared to a predetermined threshold slew rate of RSSI that is negative, then the occluded condition may be identified. In some cases, the average change in the slew rate may be calculated and compared to a predetermined threshold slew rate level to identify an occlusion event. In some further cases, a threshold slew rate may need to be identified in a predetermined threshold percentage of received wireless communication signals for the user device to identify that an occlusion event has occurred. In still further case, a variety of statistical techniques may be used to determine if there has indeed been a measurable shift in the RSSI compared to a baseline level across all and/or most of the received wireless communication signals. For example, in some cases, a student's t-test analysis may be conducted to ascertain if a particular change in the RSSI with respect to time is indeed indicative of an occlusion condition.

In further example embodiments, when the user device determines the occurrence of an antenna occlusion event, the user device may be configured to determine a correction factor associated with the occlusion event. This correction factor may be a change in the RSSI after the occurrence of an occlusion condition relative to a baseline level prior to the occlusion event. The correction factor may be determined based on a single, all, or any subset of the received wireless communication signals. In one example embodiment, the correction factor may be calculated as an average change in the RSSI before and after the occurrence of an occlusion event for all of the received signals. In another example, the correction factor may be calculated based on just the received wireless communication signals that are above a predetermined threshold power level, so that only signals with a suitably high signal-to-noise ratio (SNR) are used in the determination of the correction factor. Once the correction factor is determined, in example embodiments, the correction factor may be combined (i.e. added in units of dBm) to the RSSI measured in the antenna occluded state of the user device. Upon correction of the measured RSSI for antenna occlusion using the correction factor, the corrected RSSI measurements may be used by the user device to calculate the location of the user device, such as by triangulation methods.

In still further example embodiments, the user device, when in an identified occluded antenna condition (i.e. a correction factor is applied to correct measured RSSI levels of received wireless communication signals), the user device may detect a transition to a non-occluded condition. In other words, regardless of the mechanism that was occluding the reception of the wireless communication signals at the one or more antennas of the user device, when there is no longer an occlusion in the reception of the wireless communication signals, the de-occluded condition may be identified by the user device. The user device may identify this de-occlusion event of the one or more antennas by detecting a relatively sharp rise in the power levels associated with the received wireless communication signals. In other words, a slew rate in the time series of the RSSI associated with each of the received wireless communication signals may be above a predetermined threshold level to indicate a transition form an occluded antenna condition to a de-occluded antenna condition. Similar techniques may be applied for identifying a de-occlusion even as the occlusion event, such as applying a change in power level threshold, applying a percentage of received wireless signal threshold, and/or more sophisticated statistical techniques to the time series of RSSI data generated by repeated sampling and power measurement corresponding to each of the received wireless communication signals.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 1:
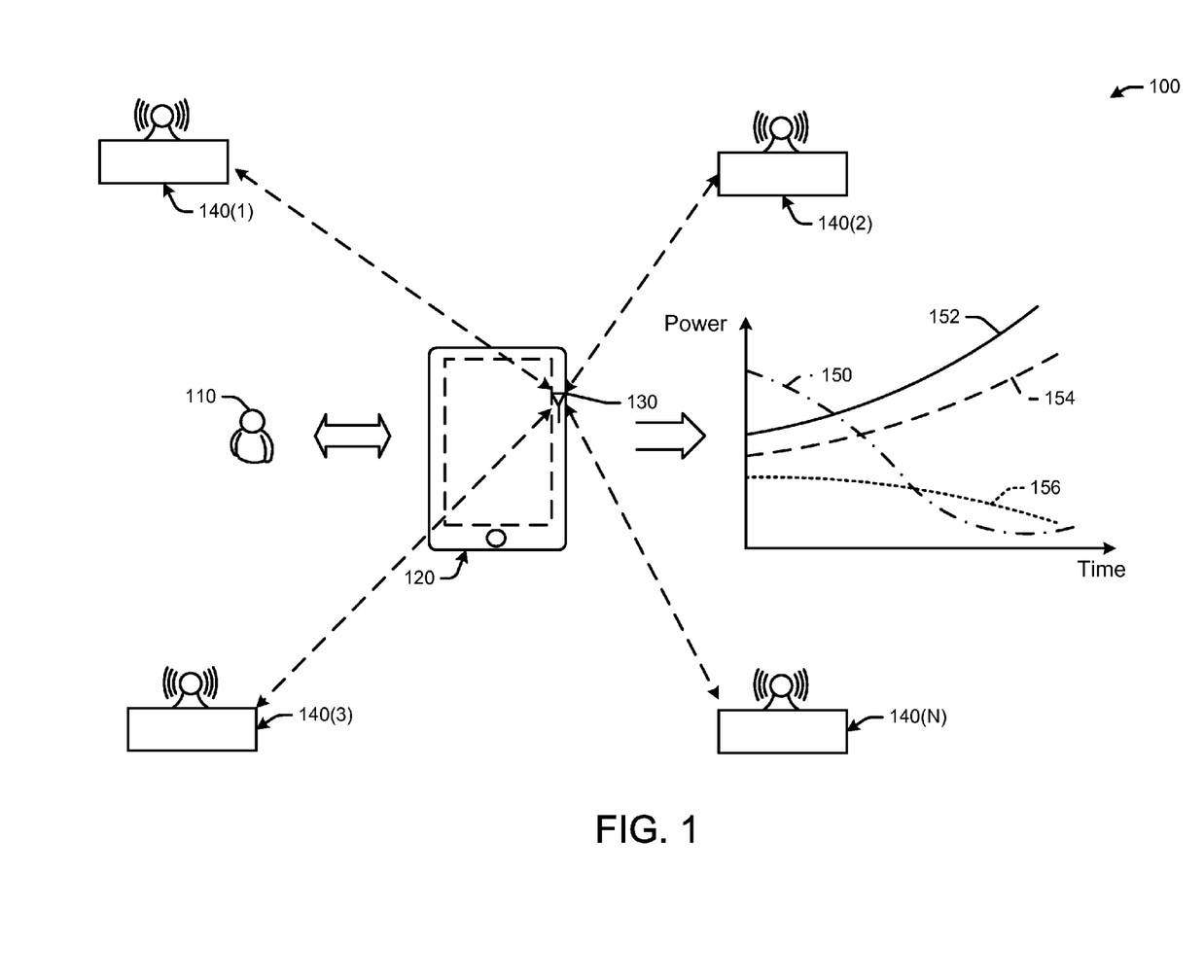
FIG. 1 is a schematic diagram that illustrates a use environment for determining location by a user device, in accordance with example embodiments of the disclosure.
Figure 2:
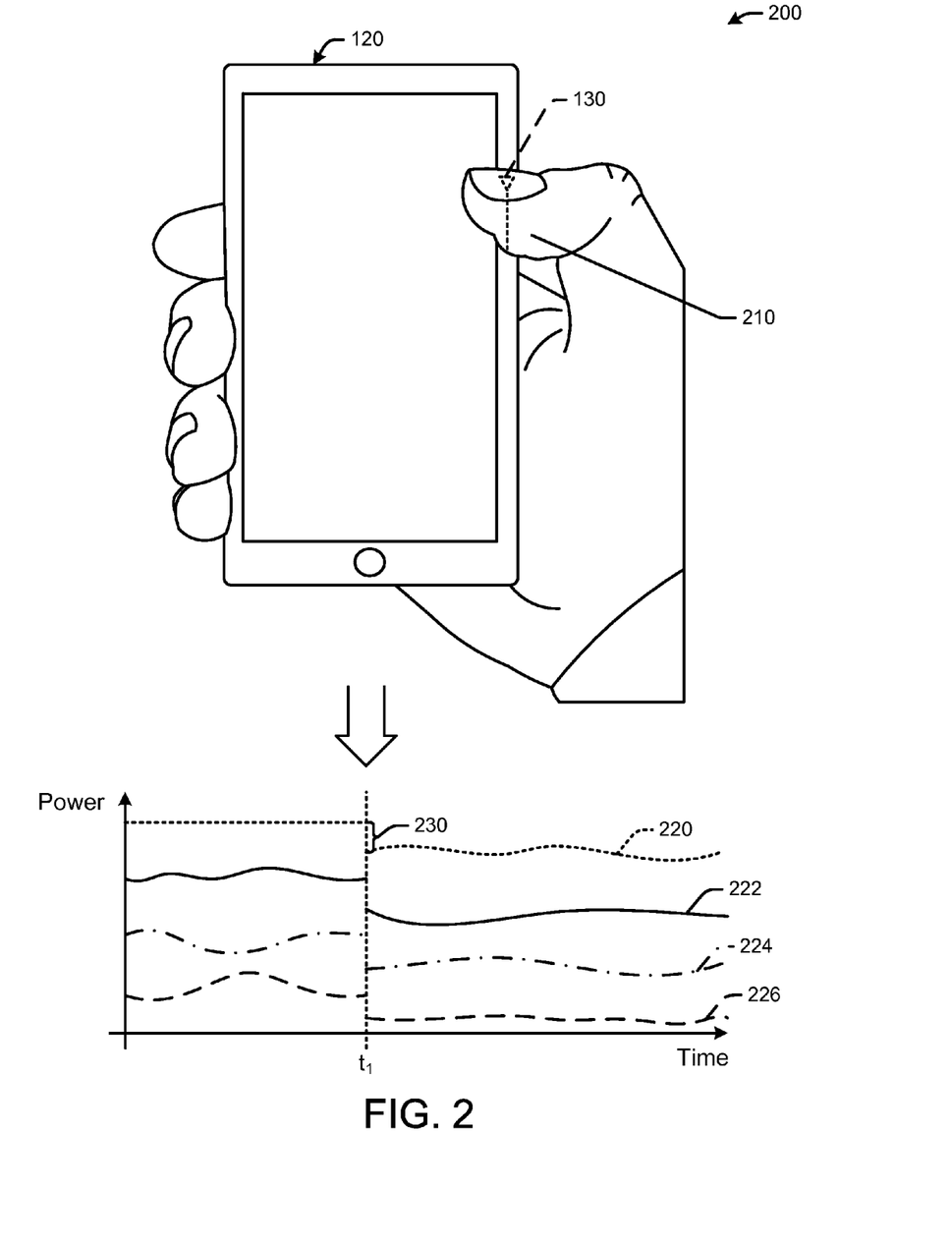
FIG. 2 is a schematic diagram that illustrates another use environment for determining the location of the user device of FIG. 1 when one or more antennas of the user device are occluded, in accordance with example embodiments of the disclosure.
Figure 3:
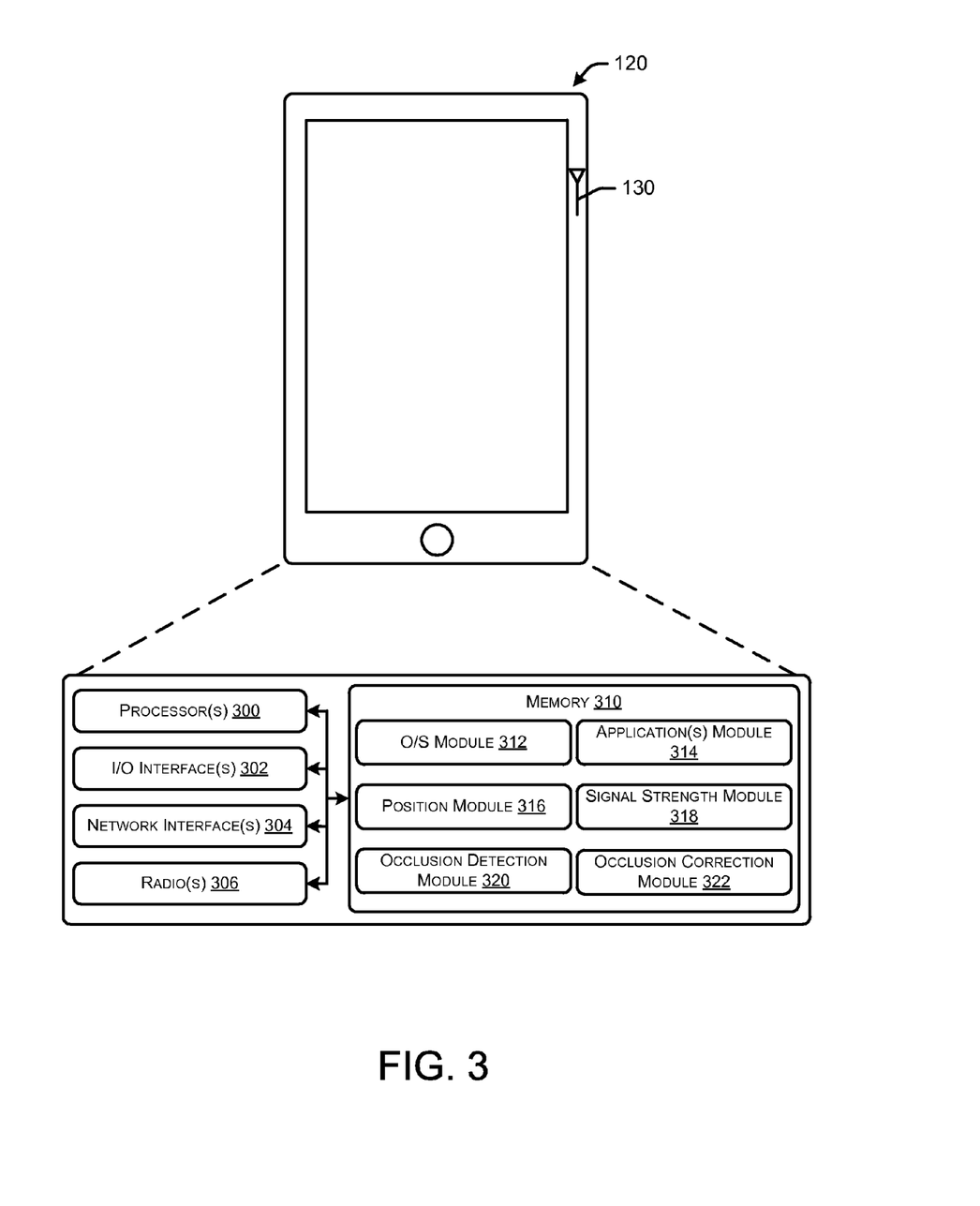
FIG. 3 is a block diagram illustrating an example user device configured to determine its location, in accordance with example embodiments of the disclosure.

The concepts as discussed above may better be understood in reference to FIGS. 1-3. FIG. 1 is a schematic diagram that illustrates a use environment 100 for determining location by a user device 120, in accordance with example embodiments of the disclosure.

The user device 120 may be configured to interact with user 110 within the environment 100 to provide a variety of services, such as services performed by executing applications and/or instructions on the user device 120. The user 110 may be able to interact with the user device via a variety of I/O interfaces to effect the execution of applications and/or providing services. Some of the services provided by the user device 120 to the user 110 may include location based services. These services may be for a variety of purposes including, but not limited to, navigation, finding products or services, gaming, location-targeted advertisements, location-targeted services, location-targeted information, combinations thereof, or the like.

The user device 120, while depicted as a smart phone device, may be one of any variety of client devices, electronic devices, communication devices, and/or mobile devices. The user device 120 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), combinations thereof, or the like. Furthermore, the user device 120 may be any suitable device capable of receiving one or more wireless communication signals and determining either its absolute or relative location therefrom.

The user device 120 may include one or more antennas 130 for receiving and/or transmitting wireless communication signals. The antenna(s) 130 may be of any suitable configuration for receiving wireless communication signals to be received by the user device 120. In example embodiments, the one or more antennas 130 may enable wireless communication using any suitable communication formats and/or protocols including, but not limited to, Wi-Fi, direct Wi-Fi, Bluetooth, 3G mobile communication, 4G mobile communication, long-term evolution (LTE), WiMax, direct satellite communication, or combinations thereof.

According to example embodiments of the disclosure, the user device 120 may be configured to receive wireless communication signals transmitted by one or more wireless communication infrastructure, depicted here as Wi-Fi APs 140(1), 140(2), 140(3), 140(N), referred to hereinafter individually or collectively as APs 140. While the wireless communication infrastructure is depicted herein as Wi-Fi APs 140, it will be appreciated that the wireless communication infrastructure may be any suitable infrastructure that transmits wireless signals that may be received by the user device 120. Example communication infrastructure may include, but are not limited to, mobile communication and/or cellular towers, Bluetooth (BT) access points, Bluetooth Low Energy (BLE) access points, Wi-Fi direct access points, combinations thereof, or the like. The communication infrastructure may be configured to provide communication services via any suitable communicative mechanism and/or protocols, including, for example, the communication formats and/or protocols discussed with relation to the user device 120. In other words, the communication infrastructure, such as APs 140, may provide communication services via any one or more of Wi-Fi, direct Wi-Fi, Bluetooth, 3G mobile communication, 4G mobile communication, long-term evolution (LTE), WiMax, direct satellite communication, or combinations thereof. In some cases, the communication infrastructure may be configured to provide communication services and/or links in only one protocol. In other cases, the communication infrastructure may provide communication services and/or links in more than one protocol.

In certain example embodiments, the APs 140 may be a wireless router. In these embodiments, the communication protocols associated with the APs 140 may be defined by various sections of Institute of Electrical and Electronics Engineers (IEEE) 802.11 standards. These standards may include, but may not be limited to, communication via 2.4 GHz channels (e.g. 802.11b, 802.11g, 802.11n), 5 GHz channels (e.g. 802.11n, 802.11ac), or 60 GHZ channels (e.g. 802.11ad).

In certain example embodiments, the user device 120 may be communicatively coupled to the communication infrastructure, such as the APs 140 or a cellular service tower, from which the communication signals are received by the user device 120 for two-way communication. The communication infrastructure may provide the user device 120 a communicative connection to communication networks, such as a local area network (LAN), wide area network (WAN), and/or the Internet. In other words, the user device 120 may be using the services of the AP 140 from which it receives the wireless communication signal. In other example embodiments, the user device 120 may be configured to receive and detect a signal strength of a wireless communication signal which the user device 120 may not be using for access to a network. In other example embodiments, the user device 120 may be communicatively coupled to some of the APs 140 for the purpose of accessing one or more networks, but not others. In some cases, the network services that may be provided by one or more of the APs 140 may be paid services that may be paid for by the user 110 or another entity associated with the user device 120.

The user device 120 may be further configured to determine a signal strength associated with each of the received signals. Furthermore, the user device 120 may be configured to repeatedly sample and determine the signal strength, such as RSSI of the plurality of wireless communication signals, such as those received from APs 140. The repeated sampling and RSSI measurement may generate a time series of RSSI data 150, 152, 154, 156 corresponding to each of the APs 140. As depicted, the time series of RSSI 150, 152, 154, 156, in a non-occluded condition, may generally vary relatively smoothly with time. In other words the time series of the RSSI 150, 152, 154, 156 of a particular received wireless communication signal or a group of received wireless communication signals may not be discontinuous with respect to time. It is seen that while some RSSI data 150, 152 increase with time, others 154, 156 may decrease with time. In this case, with time, the user device 120 may be moving towards the APs 140 that are the source of the wireless communication signals corresponding to RSSI data 150, 152 and moving away from the APs 140 that are the source of the wireless communication signals corresponding to the RSSI data 154, 156.

The time series of RSSI 150, 152, 154, 156 may be used to determine spatial movement, or change in location of the user device 120. One or more of the RSSI data points of the RSSI time series 150, 152, 154, 156, corresponding to the plurality of communication signals, may be used for comparison to other sets of RSSI data points, and changes therefrom may be used to determine locations of the user device 120. The user device 120 may be configured to use triangulation methods and/or algorithms based off of three or more received wireless communication signals to determine a relative location (e.g. location relative to previous points where RSSI was measured) and/or an absolute location (e.g. latitude, longitude, and/or altitude of the user device 120). In example embodiments, an absolute location of the user device 120 may be determined by the user device 120 based at least in part on information associated with the absolute location of the one or more APs 140, or other suitable communication infrastructure, from which wireless communication signals are received. In further example embodiments, an absolute location of the user device 120 may be determined based at least in part on an absolute measurement of a location by a mechanism other than triangulation based on received communication signal. For example, if a particular absolute location is determined using GPS signals and the user device 120 is configured to determine its relative movement from that particular location using RSSI measurements 150, 152, 154, 156 of received wireless communication signals, then the user device 120 may be configured to determine the user device's absolute location based at least in part on the known particular location and the relative movements therefrom. It will be appreciated that in determining the location of the user device from RSSI data 150, 152, 154, 156 with no antenna occlusion, the raw RSSI data 150, 152, 154, 156 may be used for the purposes of location determination without any corrections thereto.

When there is an occlusion condition, the user device 120 may be configured to identify the occlusion condition and further correct the RSSI data 150, 152, 154, 156 for the detected occlusion condition. This mechanism may be better understood with reference to FIG. 2. FIG. 2 is a schematic diagram that illustrates another use environment 200 for determining the location of the user device 120 of FIG. 1 when the one or more antennas 130 of the user device 120 are occluded, in accordance with example embodiments of the disclosure.

As depicted, the antenna 130 of the user device 120 may be occluded, such as by being covered by a thumb 210 of the user 110 holding the user device 120. While a particular mechanism for antenna occlusion is depicted, it will be appreciated that there may be any variety of mechanisms for antenna occlusion, including, for example, placing the user device 120 on an electrically conductive surface or locating the user device 120 within a faraday cage, such as a metallic elevator.

When an occlusion event occurs, such as that depicted in environment 200, the user device 120 may be configured to detect the occlusion event based at least in part on the signal strength of the wireless communication signals received by the user device 120 form the APs 140. As shown in the time series of RSSI 220, 222, 224, 226, there may be a discontinuity in the signal strength at a particular point of time ($t_1$). The RSSI at this point ($t_1$) may change substantially in a discontinuous fashion. The change in the RSSI 230 at point ($t_1$) where the occlusion condition is present is shown for the time series of RSSI 220 is shown. This change may be a negative change (i.e. the value of RSSI after $t_1$ is less than the value of RSSI before ($t_1$)).

In example embodiments, occlusion of the one or more antennas 130 of the user device 120 may be identified based at least in part on the change in the RSSI 230 of RSSI time series 220 and/or the other RSSI time series data 222, 224, 226. In some example cases, if the change in RSSI 230 is less than a threshold (i.e. a negative threshold value), then the user device may identify an occluded antenna condition. In a non-limiting example, the threshold value of the change in the RSSI before and after the onset of the occlusion condition may be in the range of about −2 dBm to about −7 dBm. In another non-limiting example, if the threshold value is set at −3 dBm and the change in RSSI 230 is determined to be −4 dBm (e.g. shift in RSSI from −60 dBm to −64 dBm), then the user device may identify the change in RSSI 230 as an indicator of antenna occlusion. In other example cases, if the average of the change in RSSI of all or a subset of the RSSI time series data 220, 222, 224, 246 are less than a threshold value (i.e. the magnitude of the change is greater than the magnitude of the threshold value), then the user device 120 may identify an occluded antenna condition. As an example, consider the threshold level to be −3 dBm and the average change in the RSSI for the time series data sets 220, 222, 224, 226 is determined to be −6 dBm, then the user device 120 may determine that the change in the average RSSI before and after $t_1$ of all of the received wireless communications signals may be indicative of an occlusion condition of the antennas 130 of the user device 120.

In some further example cases, an occluded condition may be identified by the user device 120 if the change in RSSI for a threshold percentage of RSSI data 220, 222, 224, 226 meets a RSSI change threshold condition. For example the threshold percentage may be 70%, or three out of four RSSI data meeting a change threshold condition may indicate an occlusion condition. In this case, if the change threshold is −3 dBm and the change at $t_1$ (i.e. difference between RSSI before and after $t_1$ for each data set) of RSSI data 220, 222, 224, 226, is −3.2 dBm, −4 dBm, −2.7 dBm, and −3.6 dBm, respectively, then the RSSI data 220, 222, and 226 may meet the change threshold and RSSI data 224 may not. However, since the percentage (i.e. 3 out of 4 or 75%) of the RSSI data sets 220, 222, 224, 226 that meet the change threshold condition exceed the threshold percentage (i.e. 70%), the user device 120 may identify an occluded antenna condition at $t_1$.

In still other example embodiments, suitable statistical analysis methods may be employed for identifying an occluded antenna condition. For example, a score may be generated that is related to the magnitude of the change in the RSSI data 220, 222, 224, 226 associated with each of the received wireless communication signals. This score may be utilized (e.g. compared to other scores and/or thresholded) by the user device 120 to identify an occluded condition of the antennas 130 of the user device 120. A variety of statistical techniques may be used for determining the presence of an occluded condition, such as, for example, using a student's t-test to determine if a detected change in RSSI to a statistical confidence level is indeed part of a separate distribution (i.e. occluded condition distribution). In still other example cases, one or more received wireless communication signals and associated RSSI data may not be considered in the identification of an antenna occlusion condition based at least in part on the RSSI of those wireless communication signals. For example, if the RSSI of the wireless communication signal is below a particular level then it may not be possible to get reliable information about a change in the RSSI level from that particular wireless communication signal. In these cases, the SNR of the RSSI may not be sufficient to provide a reliable measure and/or indication of the presence of an occlusion condition.

In other example embodiments, the user device 120 may be configured to determine the presence of an occluded condition of the antennas 130 based at least in part on the slew rate of the RSSI time series data 220, 222, 224, 226. The slew rate (i.e. the change in the RSSI relative to time) of the change in the RSSI time series data 220, 222, 224, 226 at or around point ($t_1$) may be a relatively large negative value and may be prevalent in a large percentage of all the received wireless communication signals. In this case the discontinuous change in the RSSI is apparent at ($t_1$) for all of the RSSI time series 220, 222, 224, 226. A calculation of the slew rate of the RSSI time series 220, 222, 224, 226 at $t_1$ may generate a negative value. This change in the RSSI or slew rate may be compared to an appropriate threshold slew rate. This threshold slew rate may be a negative value and if the measured and/or determined slew rate is less than a threshold slew rate, then the user device 120 may identify a presence of an occluded condition of the antennas 130 of the user device 120.

It will be appreciated that the example mechanisms as discussed above for determining that an occlusion event has occurred may be to distinguish between an occlusion event and normal changes in the signal strength of the wireless communication signals received at the user device 120 as the location of the user device 120 changes. Therefore, threshold levels and/or threshold conditions as discussed above may be set according to a desire to reliably identify an occlusion condition without providing false identification of an occlusion condition. Therefore, parameters, thresholds, and metrics may be used that substantially provide a robust identification of occlusion without generating false identifications of the same.

The user device 120 may further be configured to determine a correction factor based at least in part on the identification of an occluded condition of the antennas 130 of the user devices 120. The correction factor may be used to "correct" the measured RSSI for the purposes of determining the location of the user devices therefrom. The correction factor, in some example embodiments, may be equal to the change in the RSSI data 230 of one of the time series of RSSI data 220. This correction factor may be combined (e.g. added in units of dBm) with RSSI data measured and/or detected by the user device 120 to correct for the antenna occlusion condition. In other example embodiments, the correction factor may be determined as the average of the change in the RSSI before and after an identified occlusion event for all of the received wireless communications signals. In yet other example embodiments, the correction factor may be determined based at least in part on the detected change in the RSSI before and after a detected occlusion event of a subset of the received wireless communication signals. For example, received wireless signals that may be relatively weak, and therefore, may inject noise and/or otherwise decrease the reliability of the determined correction factor may be pre-filtered prior to determining the correction factor for antenna occlusion.

The user device 120 is further configured to determine when an antenna occlusion condition no longer exists. Such an event may manifest itself in the RSSI data 220, 222, 224, 226 as a relatively sharp rise with respect to time. The user device 120 may employ similar techniques as described for identifying an occlusion event for the purposes of identifying a de-occlusion event. In particular, the user device 120 may compare a change in RSSI at a point in time of one, all, or a subset of the received wireless communication signals to a predetermined threshold level. Such a threshold analysis (e.g. determine if the positive change in RSSI during a de-occluding level is greater than a positive predetermined threshold level). Furthermore, a slew rate of the RSSI corresponding to each of the received wireless communication signals may be determined and one, all, or some subset of the slew rate information may be utilized by the user device 120 to identify a de-occluding event.

FIG. 3 is a block diagram illustrating an example user device 120 configured to determine its location, in accordance with example embodiments of the disclosure. The user device 120 may include one or more processors 300, one or more I/O device interfaces 302, one or more network interface(s) 304, one or more radio(s) 306, and one or more memories 310.

As discussed above, the one or more antennas 130 may be any suitable type of antenna corresponding to the communication protocols used by the user device 120. Some non-limiting examples of suitable antennas 130 include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The antenna 130 may be communicatively coupled to the one or more radio(s) 306 to transmit and/or receive signals, such as wireless communication signals from the APs 140.

In some example embodiments, the processors 300 of the user device 120 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. The one or more processors 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 120 may also include a chipset (not shown) for controlling communication between the one or more processors 300 and one or more of the other components of the user device 120. The one or more processors 300 may also include one or more application specific integrated circuits (ASICs) or application specific standard products (ASSPs) for handling specific data processing functions or tasks.

The input/output (I/O) device(s) such as the touch sensitive display screen(s), speaker(s), haptic device(s), or the like, may be controlled via the one or more I/O device interfaces 302. The network interfaces(s) 304 may allow the user device 120 to communicate via network and/or via other communicative channels, such as via APs 140. The user device 120 may, therefore, be configured to access one or more remote servers, cloud servers, and/or cloud storage resources via the APs 140.

The radio(s) or transceivers may enable the user device 120 to receive and/or transmit wireless communication signals from the one or more communication infrastructure, such as the APs 140, via the one or more antennas 130. The radios 306 may include any suitable radio for transmitting and/or receiving radio frequency (RF) signals in the bandwidth and/or channels corresponding to the communication protocols utilized by the user device 120. The radio 306 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radio 306, in cooperation with the antennas 130, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-Wi-Fi protocols may be used and wireless communication signals of those non-Wi-Fi protocols, such as Bluetooth, dedicated short-range communication (DSRC), or other packetized radio communication, may be received by the radio 306. The radio 306 may include any known receiver and baseband suitable for communicating via the communication protocols of user device 120. The radio component 306 may further include a low noise amplifier (LNA), additional signal amplifiers, an analog-to-digital converter (ADC), one or more buffers, and digital baseband. In example embodiments, the radio 306 may be configured to determine the signal strength or RSSI associated with received wireless communication signals. Indeed, the radio may be configured to repeatedly determine the signal strength of a received wireless communication signal to determine a time series of RSSI associated with that communication signal.

The memory 310 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, a position module 316, a signal strength module 318, an occlusion detection module 320, and an occlusion correction module 322. Each of the modules and/or software may provide functionality for the user device 120, when executed by the processors 300. The modules and/or the software may or may not correspond to physical locations and/or addresses in memory 310. In other words, the contents of each of the modules 312, 314, 316, 318, 320, 322 may not be segregated from each other and may, in fact be stored in at least partially interleaved positions on the memory 310.

The O/S module 312 may have one or more operating systems stored thereon. The processors 300 may be configured to access and execute one or more operating systems stored in the (O/S) module 312 to operate the system functions of the user device 120. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more services. These instructions and/or applications may, in certain aspects, interact with the (O/S) module 312 and/or other modules of the user device 120. The applications module 314 may have instructions, software, and/or code stored thereon that may be launched and/or executed by the processors 300 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof. In certain embodiments, the applications that are stored in the applications module 314 and executable by the processors 300 may provide location based services for the user 110 based at least in part on location information determined by the processors 300 of the user device 120.

The instructions and/or functionality stored in the position module 316 may be executed by the processors 300 to provide a variety of functionality related to determining the location of the user device 120. The processors 300 may be configured to determine position of the user device 120 based at least in part on the received wireless communication signals at the one or more antennas 130 of the user device 120. The location determination by the processors 300 in a non-occluded condition may be based at least in part on the received wireless communication signals at the antennas and a determination of signal strength (e.g. RSSI) thereof, without any correction factor. The location determination by the processors 300 in a non-occluded condition may be based at least in part on the received wireless communication signals at the antennas and a determination of signal strength (e.g. RSSI) thereof with correction factor that is determined based on the receive wireless communication signals. In this antenna occlusion case, the processors 300 may be configured to correct the RSSI associated with the received wireless communications signals by combining the correction factor associated with the occlusion condition with the detected RSSI of each of the received wireless communication signals. The processors 300 may further be configured to use triangulation algorithms to determine, based at least in part on the signal strength and/or the corrected signal strength one or both of a relative location or an absolute location of the user device 120.

The instructions and/or functionality stored in the signal strength module 318 may be executed by the processors 300 to provide a variety of functionality related to determining the signal strength (e.g. RSSI) of the wireless communication signals received by the user device 120. In the context of Wi-Fi or similar wireless communication signals, received from an AP 140, the processors 300 may be configured to determine a received signal strength indicator (RSSI) metric that corresponds to a measure of power associated with the received wireless communication signal. The RSSI of a received communication signal may be determined by the processors 300 by sampling a received wireless communication signal and determining a power associated with the sampled signal. In some example embodiments, an ADC, such as an ADC integrated with the processors 300 or a stand-alone ADC of the user device 120 may be invoked to sample the received wireless communication signals and determine a signal strength, such as RSSI therefrom. The signal strength of the received wireless communication signals may be in any suitable metric and/or unit, such as scaled units, mW, and/or dBm.

The determination of the power associated with the received wireless communication signal may be performed by the processors 300 in any suitable manner. In some example embodiments, the power associated with a received wireless communication signals may be determined at an intermediate frequency (IF), prior to IF signal amplification. In other example embodiments, the power associated with the received wireless signal may be determined for the corresponding baseband frequency, prior to baseband amplification. In yet other example embodiments, the RSSI may be determined based on the as-received communication signal (i.e. including the carrier frequency of the received communication signal). In example embodiments, regardless of the mechanism for determining the signal strength of the plurality of received wireless communication signals, the same mechanism may be applied to all of the received wireless communication signals.

The instructions and/or functionality stored in the occlusion detection module 320 may be executed by the processors 300 to provide a variety of functionality related to detecting a change in the antenna occlusion condition of the user device 120. In example embodiments, occlusion of the one or more antennas 130 of the user device 120 may be identified by the processors 300 based at least in part on the change in the RSSI with respect to time. In some example embodiments, if the change in RSSI 230 is less than a threshold (i.e. a negative threshold value), then the processors 300 may be configured to identify an occluded antenna condition. In other example embodiments, the processors 300 may be configured to identify an occlusion event if the average of the change in RSSI corresponding to all or a subset of the received wireless communication signals are less than a threshold value (i.e. the magnitude of the change is greater than the magnitude of the threshold value). In some further example embodiments, the processors 300 may be configured to identify an occluded antenna condition of the user device 120 if the change in RSSI for a threshold percentage of the received wireless communication signals meet a RSSI change threshold condition.

In still other example embodiments, the processors 300 may be configured to identify an occluded antenna condition of the user device 120 based at least in part on suitable statistical analysis methods. For example, the processors may be configured to determine a score related to the magnitude of the change in the RSSI data associated with each of the received wireless communication signals. This score may be utilized (e.g. compared to other scores and/or thresholded) by the processors 300 to identify an occluded condition of the antennas 130 of the user device 120. In yet further example embodiments, a variety of statistical techniques may be utilized by the processors 300 for determining the presence of an occluded antenna condition, such as, for example, using a student's t-test to determine if a detected change in RSSI to a statistical confidence level is indeed part of a separate distribution (i.e. occluded condition distribution). In still other example embodiments, the processors 300 may be configure to determine if the one or more received wireless communication signals and associated RSSI data is to be considered in the identification of an antenna occlusion condition based at least in part on the RSSI of those wireless communication signals. For example, if the RSSI of the wireless communication signal is below a particular level then it may not be possible to get reliable information about a change in the RSSI level from that particular wireless communication signal. In these cases, the SNR of the RSSI may not be sufficient to provide a reliable measure and/or indication of the presence of an occlusion condition. In still other example embodiments, the processors 300 may be configured to determine the presence of an occluded condition of the antennas 130 based at least in part on the slew rate of RSSI time series data. This change in the RSSI or slew rate may be compared to an appropriate threshold slew rate by the processors 300.

The processors 300, by executing the instructions stored in the occlusion detection module 320, may further be configured to determine when an antenna occlusion condition no longer exists. Such an event may manifest itself in the RSSI data as a relatively sharp rise with respect to time. The processors 300 may be configured to employ similar techniques as described for identifying an occlusion event for the purposes of identifying a de-occlusion event. In particular, the processors 300 may be configured to compare a change in RSSI at a point in time of one, all, or a subset of the received wireless communication signals to a predetermined threshold level. Such a threshold analysis (e.g. determine if the positive change in RSSI during a de-occluding level is greater than a positive predetermined threshold level). Furthermore, the processors 300 may be configured to utilize a slew rate of the RSSI corresponding to each of the received wireless communication signals to identify a de-occluding event.

The instructions and/or functionality stored in the occlusion correction module 322 may be executed by the processors 300 to provide a variety of functionality related to determining a correction factor to correct for the antenna occlusion of the user device 120 antennas 130. The correction factor may be used to correct the measured RSSI signals for the purposes of determining the location of the user devices therefrom. The correction factor, in some example embodiments, may be equal to the change in the RSSI data of one of the time series of RSSI data. This correction factor may be combined (e.g. added in units of dBm) with RSSI data measured and/or detected by the processors 300 to correct for the antenna occlusion condition. In other example embodiments, the processors may be configured to determine the correction factor as the average of the change in the RSSI before and after an identified occlusion event for all of the received wireless communications signals. In yet other example embodiments, the processors 300 may be configured to determine the correction factor based at least in part on the detected change in the RSSI before and after a detected occlusion event of a subset of the received wireless communication signals. For example, received wireless signals that may be relatively weak, and therefore, may inject noise and/or otherwise decrease the reliability of the determined correction factor may be pre-filtered prior to determining the correction factor for antenna occlusion.

It will be appreciated that there may be overlap in the functionality of the instructions stored in the one or more operating systems (O/S) module 312, the applications module 314, the position module 316, the signal strength module 318, the occlusion detection module 320, and the occlusion correction module 322. In fact, the functions of the aforementioned modules 312, 314, 316, 318, 320, 322 may interact and cooperate seamlessly under the framework of the user device 120. Indeed, each of the functions described for any of the modules 312, 314, 316, 318, 320, 322 may be stored in any module 312, 314, 316, 318, 320, 322 in accordance with certain example embodiments of the disclosure. Further, in certain example embodiments, there may be one single module that includes the instructions, programs, and/or applications described within the operating systems (O/S) module 312, the applications module 314, the position module 316, the signal strength module 318, the occlusion detection module 320, and the occlusion correction module 322.

Illustrative Processes

Figure 4:
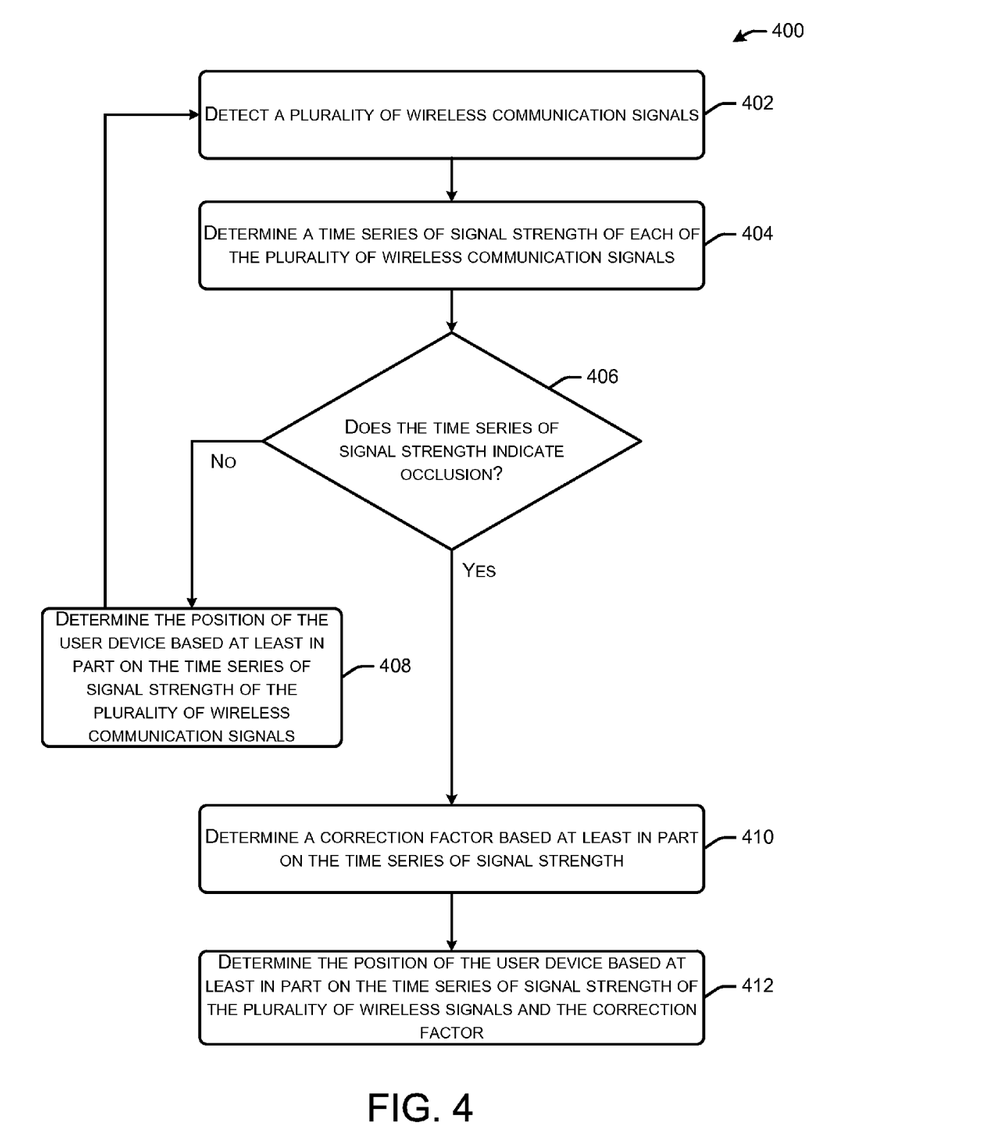
FIG. 4 is a flow diagram illustrating an example method for determining an antenna occlusion condition exists and correcting for the antenna occlusion by the user device of FIG. 3, in accordance with example embodiments of the disclosure.

FIG. 4 is a flow diagram illustrating an example method 400 for determining an antenna occlusion condition exists and correcting for the antenna occlusion by the user device 120 of FIG. 3, in accordance with example embodiments of the disclosure. According to example embodiments of the disclosure, method 400 may be performed by the user device 120 and the processors 300 thereon, in cooperation with one or more other entities.

At block 402, a plurality of wireless communication signals may be detected. The user device 120 and the processors 300 thereon may receive the wireless communication signals via one or more antennas 130 of the user device 120. The wireless communication signals received by the user device may be any suitable signal including, but not limited to, Wi-Fi signals, cellular signals, Bluetooth signals, or any variety or combinations of suitable communication signals. The wireless communication signals may be received from any variety of communications infrastructure, such as the APs 140. In some cases, the user device 120 may receive only one type of wireless communication signal. For example, a particular user device 120 may receive five different Wi-Fi signals. In other cases, the user device may receive more than one type of wireless communication signal. For example, another particular user device 120 may receive three Wi-Fi signals, two 4G LTE signals, and one BLE signal.

At block 404, a time series of signal strength corresponding to each of the plurality of wireless communication signals may be determined. In the context of Wi-Fi or other similar wireless communication signals, received from AP 140, the user device 120 and the processors 300 thereon may determine a received signal strength indicator (RSSI) metric that corresponds to a measure of power associated with the received wireless communication signal. In some non-limiting examples, the RSSI of a received communication signal may be determined by the user device by sampling a received wireless communication signal and determining a power associated with the sampled signal. In some cases, an analog-to-digital converter (ADC) of the user device 120 may be used to sample the received communication signals and determine a signal strength, such as RSSI therefrom. The signal strength of the received wireless communication signals may be in any suitable metric and/or unit. In some example embodiments, the signal strength of the received wireless communication signals may be provided on an arbitrary scale (e.g. a scale of 0 to 100). Therefore, the power of the received communication signals may be scaled for representation on the arbitrary scale. For example, the power of the received communication signals may be scaled to the most powerful of the signals received (i.e. the most powerful signal may be 100 and other signals may be a ratio that represents their power relative to the most powerful signal). In other cases, the power of the received communication signals may be represented as an absolute measurement. For example the power of the received communication signals may be represented as a raw value of their power in milli-Watts (mW) or decibels relative to a mW (dBm). In some example embodiments, the power associated with a received wireless communication signal may be determined at an intermediate frequency (IF), prior to IF signal amplification. In other example embodiments, the power associated with the received wireless signal may be determined for the corresponding baseband frequency, prior to baseband amplification. In yet other example embodiments, the RSSI may be determined based at least in part on the as-received communication signal (i.e. including the carrier frequency of the received communication signal). In example embodiments, regardless of the mechanism for determining the signal strength of the plurality of received wireless communication signals, the same mechanism may be applied to all of the received wireless communication signals.

At block 406, it may be determined if the time series of signal strengths corresponding to the detected wireless communication signals indicate antenna occlusion. Occlusion of the one or more antennas 130 of the user device 120 may be identified by the processors 300 based at least in part on the change in the signal strength with respect to time. In some example embodiments, if the change in the magnitude of signal strength is greater than a threshold magnitude of change level, then an occluded antenna condition may be identified. Alternatively, an occlusion event may be identified if the average of the change in a magnitude of signal strength corresponding to all or a subset of the received wireless communication signals exceed a threshold magnitude of change. As a further alternative, an occluded antenna condition of the user device 120 may be identified if the change in signal strength for a threshold percentage of the received wireless communication signals meet a signal strength change threshold condition.

In other example embodiments, an occluded antenna condition of the user device 120 may be identified based at least in part on suitable statistical analysis methods. For example, the processors may be configured to determine a score related to the magnitude of the change in the signal strength data associated with each of the received wireless communication signals. This score may be utilized (e.g. compared to other scores and/or thresholded) to identify an occluded condition of the antennas 130 of the user device 120. Furthermore, a variety of statistical techniques may be utilized for determining the presence of an occluded antenna condition, such as, for example, using a student's t-test to determine if a detected change in signal strength to a statistical confidence level is indeed part of a separate distribution (i.e. occluded condition distribution).

In still other example embodiments, it may be determined if the one or more received wireless communication signals and associated signal strength data is to be considered in the identification of an antenna occlusion condition based at least in part on the signal strength of those wireless communication signals. For example, if the RSSI of a particular wireless communication signal is below a particular level, then that wireless communication signal may not provide reliable information about a change in the RSSI level from that particular wireless communication signal. In these cases, the SNR of the RSSI may not be sufficient to provide a reliable measure and/or indication of the presence of an occlusion condition. In still other example embodiments, determining the presence of an occluded condition of the antennas 130 may be based at least in part on the slew rate of signal strength time series data. This change in the RSSI or slew rate may be compared to an appropriate threshold slew rate to identify an occluded antenna condition.

If it is determined at block 406 that there is no indication of antenna occlusion, then at block 408, the position of the user device may be determined based at least in part on the time series of signal strength of the plurality of wireless communication signals. One or more of the RSSI data points of the RSSI time series, corresponding to the plurality of communication signals, may be used as a baseline, and changes therefrom may be used to determine locations of the user device. The user device 120 may use triangulation methods and/or algorithms to determine a relative location (e.g. location relative to previous points where RSSI was measured) and/or an absolute location (e.g. latitude, longitude, and/or altitude of the user device 120). In example embodiments, an absolute location of the user device 120 may be determined by the user device 120 based at least in part on information associated with the absolute location of one or more communication infrastructure, such as Wi-Fi APs 140, from which wireless communication signals are received. In further example embodiments, an absolute location of the user device 120 may be determined based at least in part on an absolute measurement of a location by a mechanism other than triangulation based on received wireless communication signals. For example, if a particular absolute location is determined using GPS signals and the user device 120 determines its relative movement from that particular location using received wireless communication signals, then the user device 120 may be configured to determine the user device's absolute location based at least in part on the known particular location and the relative movements therefrom.

If at block 406, it is determined that an antenna occlusion condition exists, then the method 400 may proceed to block 410 where a correction factor may be determined based at least in part on the time series of signal strength of the plurality of wireless communication signals. The correction factor may be used to "correct" the measured signal strengths of the received wireless communication signals for the purposes of determining the location of the user devices therefrom. The correction factor, in some example embodiments, may be equal to the change in the signal strength of one of the received wireless communication signals. In other example embodiments, the correction factor may be determined as the average of the change in the signal strength before and after an identified occlusion event for all of the received wireless communications signals. In yet other example embodiments, the correction factor may be determined based at least in part on the detected change in the signal strength before and after a detected occlusion event of a subset of the received wireless communication signals. For example, received wireless signals that may be relatively weak, and therefore, may inject noise and/or otherwise decrease the reliability of the determined correction factor may be pre-filtered prior to determining the correction factor for antenna occlusion.

At block 412, the position of the user device may be determined based at least in part on the time series of signal strength of the plurality of wireless communication signals and the correction factor. This correction factor may be combined (e.g. added in units of dBm) with signal strength data measured and/or detected by the user device 120 to correct for the antenna occlusion condition. The user device 120 may use triangulation methods and/or algorithms to determine a relative location (e.g. location relative to previous points where location was determined) and/or an absolute location (e.g. latitude, longitude, and/or altitude of the user device 120) based at least in part on the corrected signal strength information.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
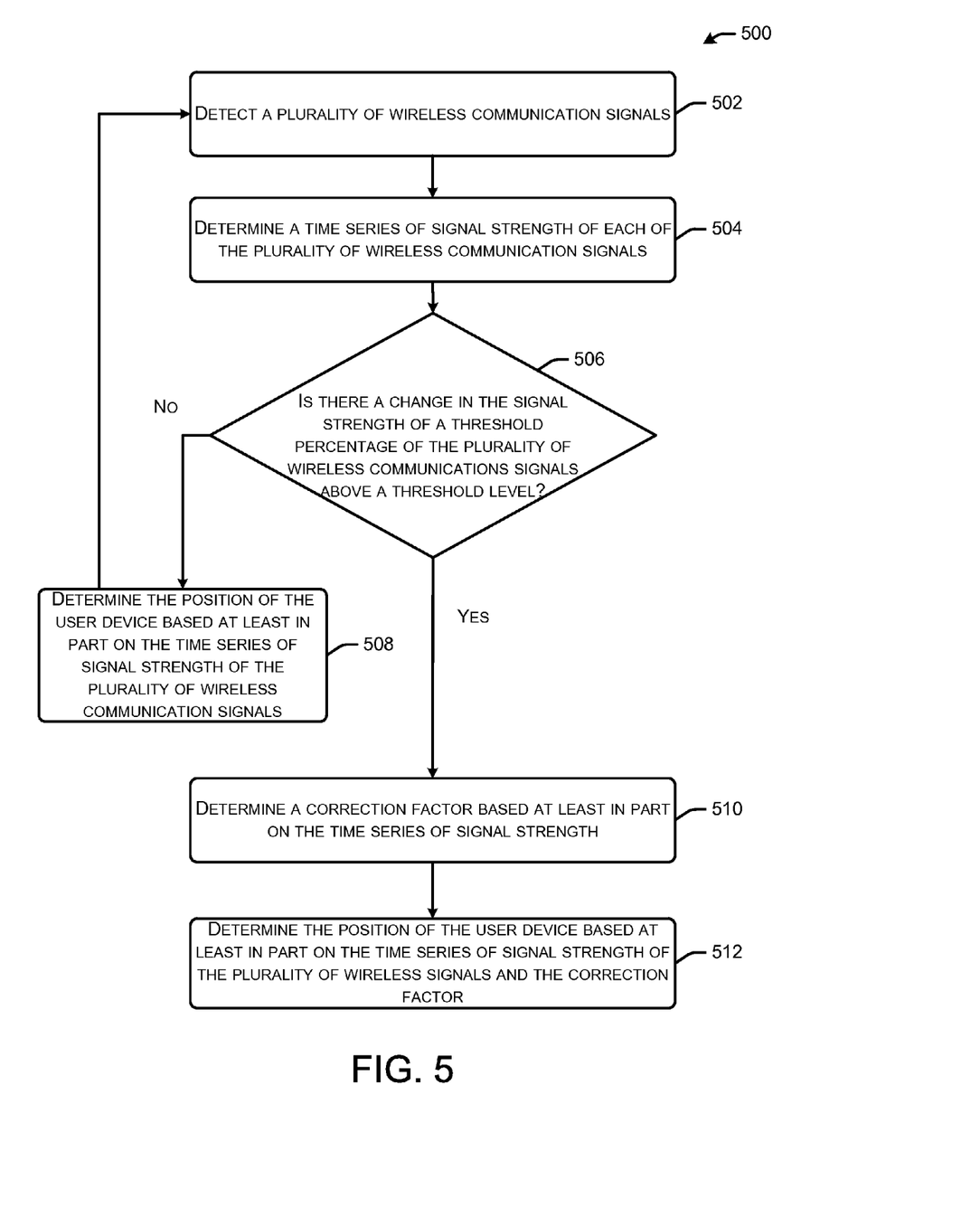
FIG. 5 is a flow diagram illustrating another example method for determining that an antenna occlusion condition exists and correcting for the antenna occlusion by the user device of FIG. 3, in accordance with example embodiments of the disclosure.

FIG. 5 is a flow diagram illustrating another example method 500 for determining an antenna occlusion condition exists and correcting for the antenna occlusion by the user device 120 of FIG. 3, in accordance with example embodiments of the disclosure. According to example embodiments of the disclosure, method 500 may be performed by the user device 120 and the processors 300 thereon, in cooperation with one or more other entities.

At block 502, a plurality of wireless communication signals may be detected. At block 504, a time series of signal strength of each of the plurality of wireless communication signals may be determined. The time series of signal strength may include at least two data points at which a signal strength may be determined. The description of the processes of blocks 502 and 504 may be similar to the descriptions of the processes of blocks 402 and 404, respectively, of method 400 of FIG. 4. Accordingly, in the interest of brevity, these descriptions will not be repeated here.

At block 506, if there a change in the time series of signal strength of a threshold percentage of the plurality of wireless communications signals above a threshold level. In other words, it may be determined if a change in the signal strength from one point of time to another for each of the plurality of received wireless communications signals is greater than a threshold level. It may then be determined if the respective change in the signal strength from the first point in time to the second point in time is greater than the threshold level for a predetermined percentage of the received wireless communications signals. In some cases, the first point in time and the second point in time may be two consecutive sampling points in the time series of signal strengths of the corresponding respective plurality of wireless communications signals. If a threshold percentage of the receive wireless communications signals change by at least a threshold level, then it may be an indicator that there may be occlusion of the one or more antennas 130 of the user device 120.

If it is determined at block 506 that there is no indication of antenna occlusion, then at block 508, the position of the user device may be determined based at least in part on the time series of signal strength of the plurality of wireless communication signals. One or more of the RSSI data points of the RSSI time series, corresponding to the plurality of communication signals, may be used as a baseline, and changes therefrom may be used to determine locations of the user device. The user device 120 may use triangulation methods and/or algorithms to determine a relative location (e.g. location relative to previous points where RSSI was measured) and/or an absolute location (e.g. latitude, longitude, and/or altitude of the user device 120). In example embodiments, an absolute location of the user device 120 may be determined by the user device 120 based at least in part on information associated with the absolute location of one or more communication infrastructure, such as Wi-Fi APs 140, from which wireless communication signals are received. In further example embodiments, an absolute location of the user device 120 may be determined based at least in part on an absolute measurement of a location by a mechanism other than triangulation based on received wireless communication signals. For example, if a particular absolute location is determined using GPS signals and the user device 120 determines its relative movement from that particular location using received wireless communication signals, then the user device 120 may be configured to determine the user device's absolute location based at least in part on the known particular location and the relative movements therefrom.

If at block 506, it is determined that an antenna occlusion condition exists, then the method 500 may proceed to block 510 where a correction factor may be determined based at least in part on the time series of signal strength of the plurality of wireless communication signals. The correction factor may be used to "correct" the measured signal strengths of the received wireless communication signals for the purposes of determining the location of the user devices therefrom. The correction factor, in some example embodiments, may be equal to the change in the signal strength of one of the received wireless communication signals between a first point in time and a second point in time. In other example embodiments, the correction factor may be determined as the average of the change in the signal strength before and after an identified occlusion event for all of the received wireless communications signals (i.e. average change in signal strength of the plurality of wireless communications signals at a first and second point in time along the time series of signal strengths). In yet other example embodiments, the correction factor may be determined based at least in part on the detected change in the signal strength before and after a detected occlusion event (i.e. one or more samples of signal strengths before detecting the occlusion event and one or more samples of signals strengths after detecting the occlusion event) of a subset of the received wireless communication signals. For example, received wireless signals that may be relatively weak, and therefore, may inject noise and/or otherwise decrease the reliability of the determined correction factor may be pre-filtered prior to determining the correction factor for antenna occlusion.

At block 512, the position of the user device may be determined based at least in part on the time series of signal strength of the plurality of wireless communication signals and the correction factor. This correction factor may be combined (e.g. added in units of dBm) with signal strength data measured and/or detected by the user device 120 to correct for the antenna occlusion condition. The user device 120 may use triangulation methods and/or algorithms to determine a relative location (e.g. location relative to previous points where location was determined) and/or an absolute location (e.g. latitude, longitude, and/or altitude of the user device 120) based at least in part on the corrected signal strength information.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
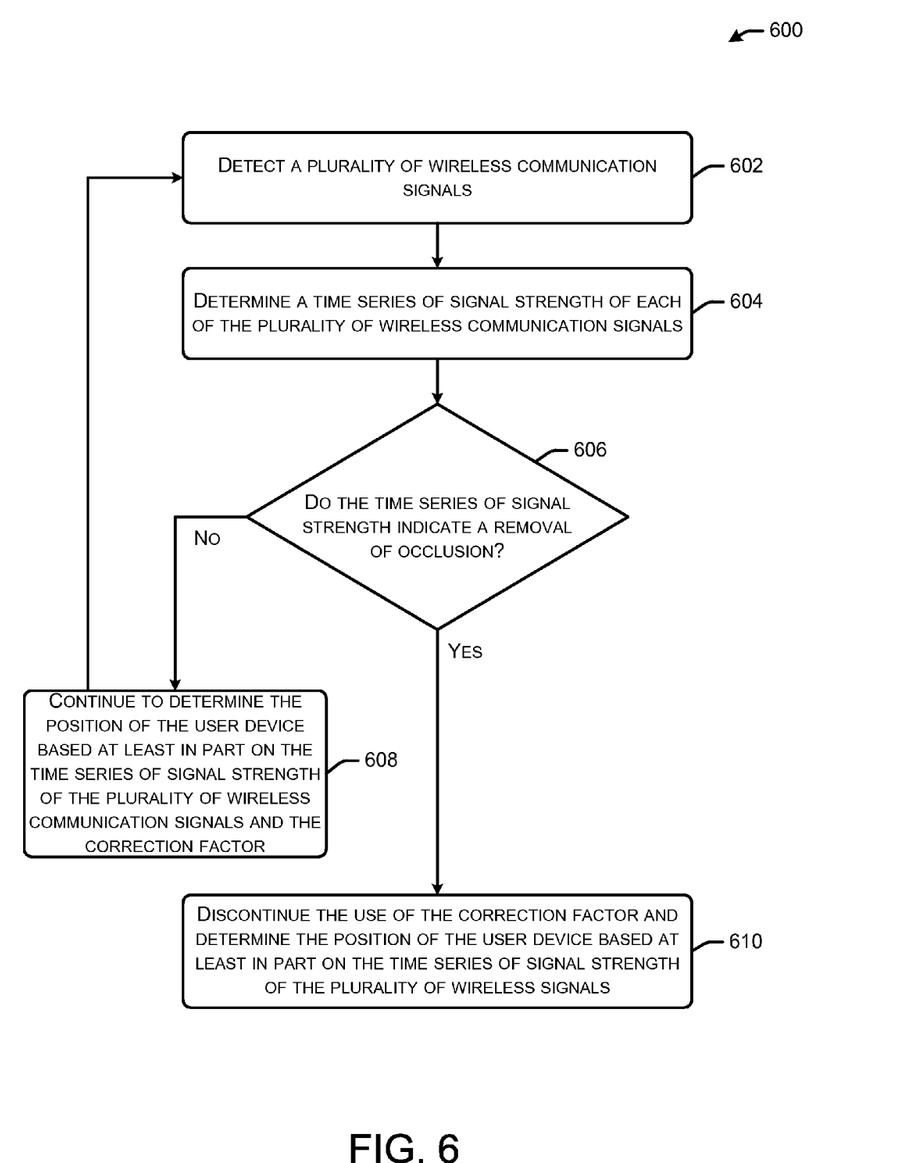
FIG. 6 is a flow diagram illustrating an example method for determining that an antenna occlusion condition no longer exists and determining location information from received wireless communication signals by the user device of FIG. 3, in accordance with example embodiments of the disclosure.

FIG. 6 is a flow diagram illustrating an example method 600 for determining that an antenna occlusion condition no longer exists and determining location information from received wireless communication signals by the user device 120 of FIG. 3, in accordance with example embodiments of the disclosure. According to example embodiments of the disclosure, method 600 may be performed by the user device 120 and the processors 300 thereon in cooperation one or more other entities.

At block 602, a plurality of wireless communication signals may be detected. At block 604, a time series of signal strength corresponding to each of the plurality of wireless communication signals may be determined. The description of the processes of blocks 602 and 604 may be similar to the descriptions of the processes of blocks 402 and 404, respectively, of method 400 of FIG. 4. Accordingly, in the interest of brevity, these descriptions will not be repeated here.

At block 606, it may be determined if the time series of signal strengths corresponding to the detected wireless communication signals indicate removal of antenna occlusion. The user device 120 may employ similar techniques as described for identifying an occlusion event for the purposes of identifying a de-occlusion event. In particular, the user device 120 may compare a change in signal strength at a point in time of one, all, or a subset of the received wireless communication signals to a predetermined threshold level. Such a threshold analysis (e.g. determine if the magnitude of change in strength during at a particular point in time is greater than a change magnitude threshold level). Furthermore, a slew rate of the signal strength corresponding to each of the received wireless communication signals may be determined and one, all, or some subset of the slew rate information may be utilized by the user device 120 to identify a de-occluding event.

If it is determined at block 606 that there is no indication of antenna de-occlusion, then at block 608, the position of the user device may continue to be determined based at least in part on the signal strength of the plurality of wireless communication signals and the correction factor. The description of the processes of blocks 608 may be similar to the description of the process of blocks 412 of method 400 of FIG. 4. Accordingly, in the interest of brevity, this description will not be repeated here.

If, however, at block 606, it is determined that an antenna occlusion condition exists, then the method 600 may proceed to block 610 where the use of the correction factor may be discontinued and the position of the user device may be determined based at least in part on the time series of signal strength of the plurality of wireless communication signals. The description of the processes of blocks 610 may be similar to the description of the process of blocks 410 of method 400 of FIG. 4. Accordingly, in the interest of brevity, this description will not be repeated here.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

It will be appreciated that the embodiments, as described here, provide a mechanism for a relatively more robust determination of location by user devices 120. Due to the nature and the use environment of user devices 120, antenna occlusion conditions may occur relatively frequently. Furthermore, with increasing demand for location based services, the user device 120 may execute one or more applications thereon that use location information of the user device 120. Therefore, the user device 120 according to the embodiments described herein may be relatively better configured to provide robust and reliable location based information, even when antenna occlusion conditions may occur, and thereby provide a relatively more user-friendly functionality. It will further be appreciated that the systems and methods as described herein, for detecting and correcting for an occlusion condition of antennas may be applied to applications other than determining location of the user device 120.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A user device, comprising:
an antenna to receive a plurality of wireless communication signals from a plurality of wireless communication access points;
at least one memory that stores computer-executable instructions;
at least one processor that accesses the at least one memory, wherein the at least one processor executes the computer-executable instructions to:
determine a first signal strength of a first communication signal received from a first wireless communications access point at a first time;
determine a second signal strength of a second communication signal received from a second wireless communications access point at substantially the first time;
determine a third signal strength of a third communication signal received from the first wireless communications access point at a second time;
determine a fourth signal strength of a fourth communication signal received from the second wireless communications access point at substantially the second time;
determine a first change in signal strength using the first signal strength and the third signal strength;
determine a second change in signal strength using the second signal strength and the fourth signal strength;
determine that the antenna is at least partially occluded during the second time, wherein the first change or the second change in signal strength is greater than a predetermined threshold;
determine a correction factor using the first, the second, the third, and the fourth signal strengths based at least in part on the first change or the second change being greater than the predetermined threshold;

determine a first corrected signal strength by combining the correction factor with the first signal strength;

determine a second corrected signal strength by combining the correction factor with the second signal strength; and determine a location of the user device based at least in part on the first corrected signal strength and the second corrected signal strength.

2. The user device of claim 1, wherein the at least one processor further executes the computer-executable instructions to:

determine, based at least in part on a third set of signal strengths from a third plurality of wireless communication signals received from the plurality of wireless communications access points at substantially a third time, that the occlusion condition is no longer present; and based at least in part on the determination that the occlusion condition is no longer present, determine a second location of the user device based at least in part on the third set of signal strengths.

3. The user device of claim 2, wherein the at least one processor executes the computer-executable instructions to determine that the occlusion condition is no longer present by detecting that a magnitude of change between the second set of signal strengths and the third set of signal strengths is greater than a second predetermined threshold level.

4. The user device of claim 1, wherein to determine that the antenna is partially occluded during the second time, the at least one processor is further configured to determine a conductive element in the proximity of the antenna.

5. A method, comprising:

receiving, by a user device comprising one or more processors, a plurality of wireless communication signals;

determining, by the user device, a first signal strength corresponding to a first received wireless communication signal from a sending device at a first time;

determining, by the user device, a second signal strength corresponding to a second received wireless communication signal from the sending device at a second time after the first time;

determining that the antenna is at least partially occluded based on determining that a magnitude change between the first signal strength and the second signal strength is greater than a predetermined threshold;

determining a correction factor using the first signal strength and the second signal strength based at least in part on the magnitude change being greater than the predetermined threshold;

determining a corrected signal strength by combining the second signal strength with the correction factor; and determine a location of the user device based at least in part on the corrected signal strength.

6. The method of claim 5, further comprising determining, by the user device and based at least in part on determining that the occlusion condition is present, a correction factor associated with the plurality of received wireless communication signals and based at least in part on the first signal strength and the second signal strength.

7. The method of claim 6, wherein determining the correction factor associated with the plurality of received wireless communication signals comprises determining a change between the first signal strength and the second signal strength.

8. The method of claim 6, further comprising determining, by the user device, a location of the user device based at least in part on the second signal strength and the correction factor.

9. The method of claim 5, wherein determining the second signal strength comprises determining, by the user device, a time series of signal strengths corresponding to the sending device.

10. The method of claim 5, wherein determining that an occlusion condition is present comprises determining, by the user device, that a magnitude of change between the first signal strength and the second signal strength is greater than a predetermined threshold level.

11. The method of claim 5, further comprising:

determining, by the user device and based at least in part on a third signal strength corresponding to a third received wireless communication signal from the sending device at a third time, that the occlusion condition is no longer present; and determining, by the user device and based at least in part on the determination that the occlusion condition is no longer present, a location of the user device based at least in part on the third signal strength.

12. The method of claim 11, wherein determining that the occlusion condition is no longer present comprises identifying that a magnitude of change between the third signal strength and the second signal strength satisfies a predetermined criteria.

13. At least one non-transitory computer-readable medium comprising computer-executable instructions that, when executed by one or more processors, executes a method comprising:

receiving, by a user device, a plurality of wireless communication signals;

determining, by the user device, a first signal strength corresponding to at least one of the received plurality of wireless communication signals at a first time;

determining, by the user device, a second signal strength corresponding to the at least one of the received plurality of wireless communication signals at a second time after the first time;

determining that the antenna is at least partially occluded based on determining that a magnitude change between the first signal strength and the second signal strength is greater than a predetermined threshold;

determining a correction factor associated with the plurality of received wireless communication signals based at least in part on the magnitude change between the first signal strength and the second signal strength being greater than a predetermined threshold;

determining a corrected signal strength by combining the second signal strength with the correction factor; and determining a location of the user device based at least in part on the corrected signal strength.

14. The at least one computer-readable medium of claim 13, wherein determining the location of the user device further comprises:

triangulating based at least in part on the corrected signal strength.

15. The at least one computer-readable medium of claim 13, wherein the method further comprises:

determining, based at least in part on a third signal strength corresponding to the at least one of the received wireless communication signals at a third time, that the occlusion condition is no longer present; and determining, based at least in part on the determination that the occlusion condition is no longer present, a location of the user device based at least in part on the third signal strength.

* * * * *